(12) United States Patent
Krutsch et al.

(10) Patent No.: US 8,973,017 B2
(45) Date of Patent: Mar. 3, 2015

(54) PRODUCTIVITY APPLICATION MANAGEMENT

(76) Inventors: Kenneth F. Krutsch, Minneapolis, MN (US); Michael Berger, New Brighton, MN (US); James L. Rice, III, Minneapolis, MN (US)

(*) Notice: Subject to any disclaimer, the term of this patent is extended or adjusted under 35 U.S.C. 154(b) by 1267 days.

(21) Appl. No.: 10/751,221

(22) Filed: Jan. 2, 2004

(65) Prior Publication Data

US 2004/0199922 A1    Oct. 7, 2004

Related U.S. Application Data

(63) Continuation-in-part of application No. 09/866,454, filed on May 25, 2001, now Pat. No. 7,424,543, which is a continuation-in-part of application No. PCT/US00/24719, filed on Sep. 8, 2000.

(60) Provisional application No. 60/437,662, filed on Jan. 2, 2003, provisional application No. 60/152,721, filed on Sep. 8, 1999, provisional application No. 60/152,756, filed on Sep. 8, 1999, provisional application No. 60/193,599, filed on Mar. 31, 2000.

(51) Int. Cl.
| | | |
|---|---|---|
| G06F 9/44 | (2006.01) | |
| G06F 9/46 | (2006.01) | |
| G06F 17/00 | (2006.01) | |
| G06F 15/16 | (2006.01) | |
| G06Q 30/02 | (2012.01) | |
| G06F 17/30 | (2006.01) | |

(52) U.S. Cl.
CPC .......... *G06Q 30/02* (2013.01); *G06F 17/30557* (2013.01)

USPC .......... 719/320; 719/313; 709/201; 709/203; 709/217; 715/200; 715/733; 715/742; 715/748; 715/751

(58) Field of Classification Search
USPC .......... 709/201–203, 217–219, 227; 715/744, 715/760; 719/310, 313, 330
See application file for complete search history.

(56) References Cited

U.S. PATENT DOCUMENTS

| | | | |
|---|---|---|---|
| 6,571,245 B2 * | 5/2003 | Chun et al. ..................... 707/10 |
| 6,654,784 B1 * | 11/2003 | Wei ................................. 709/203 |
| 6,725,238 B1 * | 4/2004 | Auvenshine .................. 707/200 |
| 6,920,502 B2 * | 7/2005 | Araujo et al. ................. 709/229 |
| 6,981,041 B2 * | 12/2005 | Araujo et al. ................. 709/224 |
| 7,111,060 B2 * | 9/2006 | Araujo et al. ................. 709/224 |
| 7,155,681 B2 * | 12/2006 | Mansour et al. ............. 715/762 |
| 2002/0026507 A1 * | 2/2002 | Sears et al. ..................... 709/224 |
| 2002/0065879 A1 * | 5/2002 | Ambrose et al. .............. 709/203 |
| 2002/0109718 A1 * | 8/2002 | Mansour et al. .............. 345/744 |
| 2002/0111995 A1 * | 8/2002 | Mansour et al. .............. 709/203 |
| 2002/0129096 A1 * | 9/2002 | Mansour et al. .............. 709/203 |
| 2003/0217166 A1 * | 11/2003 | Dal Canto et al. ............ 709/229 |

OTHER PUBLICATIONS

Office Action for U.S. Appl. No. 09/866,454, May 6, 2005.*
Office Action for U.S. Appl. No. 09/866,454, Jun. 19, 2006.*

* cited by examiner

Primary Examiner — Qing Wu

(57) ABSTRACT

A method for managing third-tier productivity applications, as part of remote application deployment, consists of using a controlling program, called an AppController, to initiate the application launch which then allows otherwise incompatible programs to control and/or enhance the functionality of the productivity application by accepting commands transmitted using standard network communications protocols.

7 Claims, 8 Drawing Sheets

Host/Port File
Update Details
(Third-tier UNIX/Linux)

Initial Application
Launch
(UNIX/Linux)

PRODUCTIVITY APPLICATION MANAGEMENT

PRIORITY CLAIM

This application claims the benefit of U.S. Provisional Application 60/437,662, filed Jan. 2, 2003; and is a continuation-in-part of U.S. patent application Ser. No. 09/866,454, filed May 25, 2001 now U.S. Pat. No. 7,424,543, which in turn is a continuation-in-part of PCT application PCT/US00/24719, filed Sep. 8, 2000, which claimed priority to U.S. Provisional Application No. 60/152,721, filed Sep. 8, 1999, U.S. Provisional Application No. 60/152,756, filed Sep. 8, 1999, and U.S. Provisional Application No. 60/193,599, filed Mar. 31, 2000. The Ser. No. 09/866,454 priority application and the 60/437,662 provisional application are hereby incorporated by reference.

TECHNICAL FIELD

This invention relates to the field of remote application deployment, typically within the context of managed application access via remote desktop technology.

BACKGROUND OF THE INVENTION

The present invention relates to the utilization of a remote application to open a remotely located document. In the preferred embodiment, the present invention opens the document in response to the activation of a hyperlink, selection of a reference, or some other indication by a user that they wish to access a particular document. In this description, the use of a reference or hyperlink in this matter is referred to as an AppLink. The technology for creating and using an AppLink is described in detail in the Ser. No. 09/866,454 priority application. The primary purpose of the Applink technology is to avoid costly, insecure and time-consuming physical distribution of documents, while also avoiding the problems inherent in the the electronic distribution of documents over the Internet.

The AppLink technology utilizes a three-tier application access technology that is known in the prior art. This prior art technology is typified by the remote application access ("RAA") software solutions provided by Tarantella, Inc. (Santa Cruz, Calif.) and Citrix Systems, Inc. (Fort Lauderdale, Fla.). RAA software solutions generally provide the thin-client software running on the recipient's computer (the first-tier), and RAA server software operating on the second tier. The second-tier RAA server software is capable of launching a server-side software application, running on a server within the third-tier. The software application's user interface is remotely presented to the recipient via the thin-client, providing fully functional access to the third-tier application. The second-tier RAA server software then controls the flow of information (the user inputs and interface) between the first-tier thin-client and applications running on the third-tier servers. To interact with the third-tier application servers, the second-tier RAA server generally utilizes well-known application platform protocols such X Windows, Microsoft's Remote Desktop Protocol (Microsoft, Inc., Redmond, Wash.), and terminal protocols like VT, 3270, and 5250.

The AppLink technology supplements prior art RAA solutions by associating a link or reference with a document, while also associating a set of attributes or properties with that document. With an AppLink, it is not necessary to send a document from one user to another. Instead, only a reference to the document needs to be communicated to the user. The key to the solution is its ability to encapsulate a document and an application into a single hyperlink or other reference, such as a Uniform Resource Locator (URL), that enables assured, ubiquitous access to that document.

When a user selects or "opens" an AppLink, specialized AppLink server software operating on the second-tier locates and retrieves the desired document within server-side storage, launches the appropriate third-tier application software, opens the desired document in the third-tier application, and then ensures delivery of the thin-client user interface to the client. The second-tier AppLink server software is also responsible for ensuring that the user interfaces with the third-tier application software through an isolated account of a type appropriate to the application software (e.g., NIS/LDAP for UNIX/Linux applications or Active Directory for MS Windows applications). The software components that make all of this happen are collectively known as user provisioning.

The AppLink document attributes are generally created when the AppLink itself is created, and are stored as file-specific meta-data. This meta-data can be hidden within the AppLink itself, or can be stored externally (such as in a database) and be referenced by the AppLink. One such property might designate the software application that should open the file (e.g., Microsoft Word for opening a word processing document). This software application can be pre-selected when the AppLink is created. Alternatively, and preferably, the AppLink server can select the software application at access time from among several possible applications. This run-time selection of application programs allows for multiple licensing models. For example, an external, anonymous access may utilize a less expensive/royalty-free application software, while internal, named account users will use more expensive application software that has already been licensed for that user. The selection of an application for a document and a specific user is generally referred to as application provisioning. AppLink attributes may also include an access password required before a user can view the document, permission to print and/or download the document, permission to modify the document and then return changes to the sender, access duration (i.e., to/from dates for valid access), recipient identification requirements, and AppLink sender notification options (e.g., an e-mail indicating access). These attributes provide a simple form of digital rights management.

Within the context of an AppLink, one of the fundamental challenges to overcome is programmatically managing the third-tier productivity application. Without such management, it would be impossible to implement some of the above-described features, such as the digital rights management features that limits the type of activities the user may perform on a particular document. One way to manage or control these productivity applications on the third tier is by managing the launching of the application through a program launcher. Most operating systems (e.g., Microsoft Windows, Sun Solaris) contain shell or application launching programs that do exactly that—they accept commands that start other programs. Unfortunately, program launchers have significant shortcomings when it comes to the control necessary to effectively manage a third-tier productivity application.

One such shortcoming is the assumption that the user has a dedicated user profile on the machine that is running the productivity application. In the case of AppLink, the productivity application's user interface is routinely delivered to a relatively anonymous remote user—outside of the knowledge of the application. Application-specific settings may not be suitable to display the document in the manner intended. For example, the document may be a workflow file that is intended to show modifications by a series of users. Normally, the editing productivity application would be physically installed on the recipient user's machine and, hence, would inherit the user's personal attributes (e.g., display name). Subsequent document changes would normally be able to record the author's display name. Server-side application deployment makes it cumbersome for a Web-based user to personalize an application before its use.

Another shortcoming of existing program launchers is the assumption that the user is physically located at the machine that is running the productivity application. Again, the productivity application's user interface is delivered to the remote user—outside of the knowledge of the application. Programmatically controlling the shutdown of software applications becomes vital when users are remote and are using essentially unmanaged applications (i.e., productivity applications that are document-centric, as opposed to client/server applications that connect to managed resources that are designed to recover from sudden disconnects from the client software). A prolonged network disconnect may suspend the user's session but, ultimately, the program launcher is left with the choice of either leaving server resources allocated forever, or to force a termination of the productivity application without giving the application a chance to save data, complete document processing or to even clean up temporary files.

Furthermore, prior art RAA software such as Tarantella Enterprise 3 allows a single command-line invocation as the only means for interacting with the third-tier application. In other words, once the application session is initiated, the second-tier loses control over the environment, except to terminate the session without warning. That is not to say no communication takes place with the third-tier application software. Remote interface display technologies, such as Microsoft's RDP and the Open Group's X window system, allow for separate virtual channels for carrying device communication and presentation data from the third-tier server (application output), as well as mouse and keyboard data from the client (input data). These channels may be used to provide features that require communications between the client device and a third-tier application running in a Terminal Services or X windows session (e.g. providing client-side printer information to the third-tier server for proper output formatting). Unfortunately, these communications channels run directly between the client device and the third-tier session environment—the second-tier has no access to these channels. Additionally, the communication channel cannot provide access to application-specific functionality, as the application itself is not generally programmed to listen for such data.

Prior art systems also have problems with load balancing. Remotely deployed applications typically run within an array of third-tier servers set aside for this purpose and they often support a relatively large number of remote users. Application provisioning restrictions and/or load balancing considerations will create an environment where one user may be running third-tier applications on more than one third-tier server. Limiting the number of distinct application processes, or remote display sessions, is vital to supporting a large number of users.

Most program launchers will simply invoke the same command using the same steps; that is, to view two MS Word documents, launch Microsoft Word twice with two different document names. Microsoft Windows would normally invoke WINWORD.EXE twice on the third-tier machine. Microsoft Word is designed to only launch one copy of the application and simply present two separate windows containing the respective documents. Clicking on the close-glyph of the first Word window will only close the first document. Repeat the same steps with MS Excel; closing the first document window will close all Excel windows. Performing the same exercise with Microsoft Visio will result in yet another interaction model: multiple documents running within a single application window. Sun StarOffice differs even more, as a single executable implements document functions for all of the standard office formats. These subtle interaction differences create problems when deploying a heterogeneous mix of applications outside of their normal environment (i.e., in the third-tier instead of in a collection of UNIX/Linux and Windows desktops).

SUMMARY OF THE INVENTION

The present invention relates to the ability of a local computer interface to control an application operating on a remote computer. More specifically, the present invention allows the local interface to Accordingly, it is the object of the present invention to provide programmatic control over the third-party software applications that run on the third-tier. This invention allows external software (such as on that running on the second-tier) to programmatically manage the application for a variety of purposes, such as:
 loading new/additional documents,
 saving documents before application shutdown,
 notification of proper printer hook-up,
 enabling/disabling application-specific features,
 providing enhanced functionality (i.e., support for track changes features in applications that do not support such functionality), and
 providing control over user interface display, reporting application activity, et al.

These and other objects, features and advantages of the present invention will become apparent from the following description and accompanying drawings of one specific embodiment thereof.

DETAILED DESCRIPTION OF THE INVENTION

AppLink Technology Example

Figure 1:
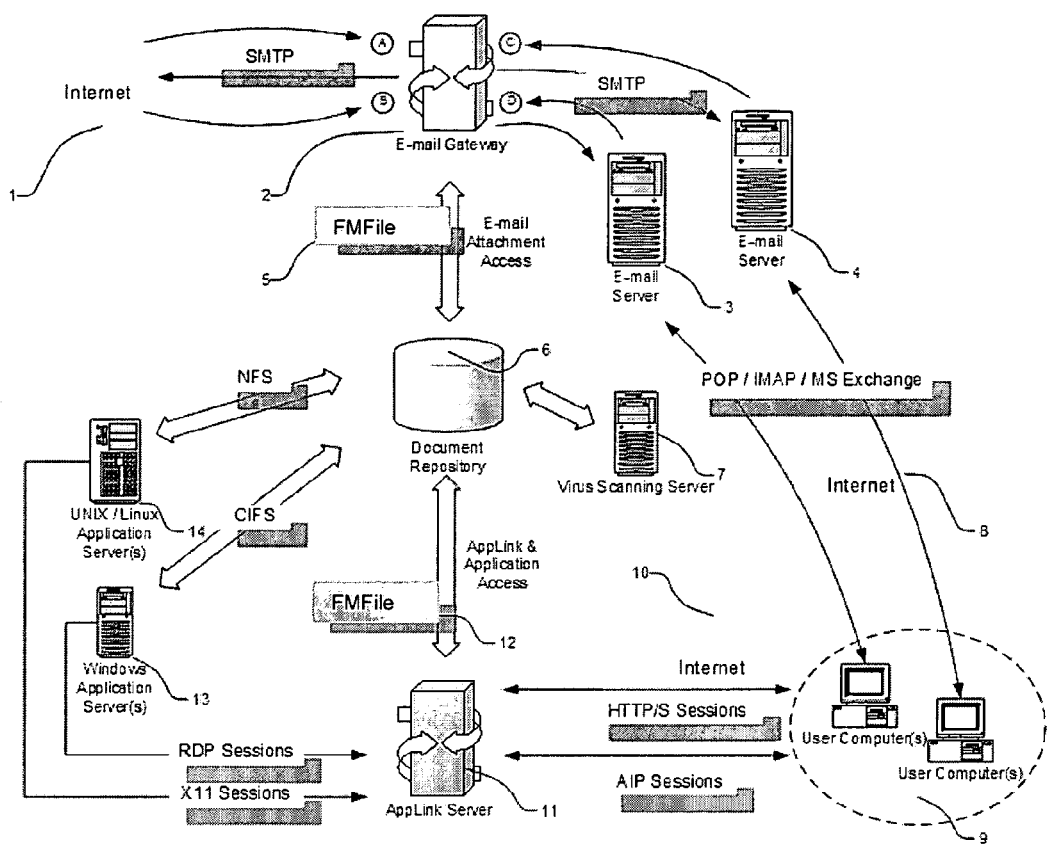
FIG. 1 is a schematic block diagram illustrating the datacenter components used to manage documents with AppLink technology.

The usefulness of the AppLink technology and the purpose of the application controlling software of the present invention are best understood by reviewing a sample embodiment, such as that shown in FIG. 1. In this Figure, AppLinks are created for documents stored in a document repository 6. These AppLinks are automatically for attachments found on incoming e-mails at e-mail gateway 2, and are created through user interaction for documents selected or created by a user at one of the user computers 9. This is explained in more detail below.

E-Mail Gateway. Inbound e-mail traffic originates from the Internet 1 and is routed to a computer operating as the E-mail Gateway 2 that uses AppLink technology. This routing occurs as a result of one or more MX records set within DNS to direct the e-mail traffic of one or more domains and/or sub-domains to the E-mail Gateway 2. E-mail Gateway 2 may define multiple TCP ports as receivers for incoming mail. For example, a layer-4 switch might proxy SMTP connections destined for somedomain.com to port A on the E-mail Gateway 2, and SMTP connections destined for sub.somedomain.com to port B. In this way, a single E-mail Gateway 2 may process e-mail for a number of Internet domains and sub-domains.

Inbound SMTP connections received by the E-mail gateway 2 are transparently proxied to one or more SMTP E-mail servers 3 and 4. These E-mail servers 3, 4 may be located within the same data center as the Gateway 2, or can by physically remote from the Gateway 2. In fact, the E-mail servers 3, 4 can be contained within the same physical computer that is operating as the E-mail Gateway 2.

The e-mail gateway 2 examines incoming e-mail for attachments, using a variety of processing rules that are selected based on the incoming e-mail gateway port (A or B). Processing rules include examining attachment data for a specified MIME types, file extensions, and/or attachment size. For example, a particular set of processing rules may specify that all e-mail attachments received on port A that have a specific MIME type or file extension must be removed by the e-mail gateway 2. Simultaneously, the processing rules for port B may indicate that all attachments over 50 Kilobytes are to be removed by gateway 2. If an incoming E-mail attachment on a particular port matches the port's processing rules, the e-mail gateway 2 removes the attachment from the SMTP e-mail message and replaces it with an HTML stub containing an AppLink referencing the attachment. The e-mail message with the HTML stub is then proxied to the appropriate destination server 3, 4. If no attachment is removed by the E-mail gateway 2, the incoming SMTP E-mail message is transparently proxied to the destination server at 3, 4 without alteration.

The e-mail gateway 2 stores the removed e-mail attachments on the document repository 6 through the FMFile software layer 5. The document repository 6 may be a simple, flat file system (e.g., NFS or CIFS network storage) or may be a sophisticated document storage database, accessed using a proprietary API that supports a document check-in/check-out paradigm.

E-mail attachments that are stored in the document repository 6 are preferably scanned for known computer viruses by the virus scanning server located 7. This mechanism provides immediate protection against attachment-borne viruses that are already known by the virus scanning server 7. Unfortunately, the anti-virus scanning server 7 cannot effectively identify new viruses until programmed for those viruses by the software vendor. This takes time, as the anti-virus vendor must become aware of the virus, program new code for the virus scanning server 7 so that the new virus can be identified, and then download this new code to the server 7. Consequently, the virus scanning server 7 preferably scans attachments in the document repository 6 both when attachments are initially stored within the repository 6 and when the attachments are later accessed for opening (see below). This two-part scanning means that previously unknown viruses not identified when the attachment is stored may be subsequently recognized when the file is opened.

Users on computers 9 download E-mail from servers 3 and 4 using standard protocols such as POP, IMAP and MS Exchange. When an E-mail attachment has been replaced with an HTML stub, the user sees the HTML stub as an attachment to the e-mail in place of the original attachment. When the user opens the HTML stub, the AppLink in the HTML stub is opened. In this case, that means that the default Internet browser is typically launched (i.e., HTML documents are normally associated with a standard web browser). This HTML stub contains the AppLink. The Applink will likely be in the form of a URL pointing to an Applink Server 11, with the URL also containing an associated ID number. This ID is used by the Server 11 to identify a particular document stored in the repository 6 as well as identifying parameters or preferences associated with that document. Preferably, this ID was created when the FMFile software layer 5 stored the attachment on the document repository 6.

User Uploading. In addition to incoming e-mail attachments, documents may be added to document depository 6 via an HTTP upload. To accomplish this, a user on computer 9 will connect to an AppLink Server 11 via the Internet or other network 10. Once connected, the user computer 9 requests an upload page from the AppLink server 11, such as by requesting a web page from server 11 using HTTP The upload page then allows the user at 9 to specify a document for uploading to the document repository and for creating the associated This file can be identified through the user's normal file system, and can be located on a local hard disk residing on user computer 9 or on a remote storage device accessible through the user's file system. In addition to uploading a document, the user can create a document directly on the document repository 6 using third-tier server-side applications. Note that storing the document and scanning for viruses occurs in a manner similar to that described above for E-mail attachments, using a document repository 6 and FMFile software layer 12 that may or may not be the same physical computers and/or storage devices described for the E-mail gateway 2.

Documents may also be added to the repository 6 using synchronization software that transfers documents to and from the AppLink server 11 and the user computers 9. The outcome is similar to using HTTP to upload a document, but proprietary protocols are used to transfer data. One such protocol is provided by Tarantella, which provides a client drive mapping feature that maps a hard drives on user computer 9 to storage locations associated with the document repository 6.

Once the document is stored in the repository 6, an AppLink is created to the document. Unlike the situation described above for the e-mail gateway 2, there is no reason to store the AppLink within an HTML stub file. Instead, the AppLink is simple presented to the user, such as in the form of a URL to the AppLink server 11 with an associated ID. The user is then free to embed the AppLink within an e-mail message, a web page, an instant message transmission, or any other document, just like the user could do with a standard URL hyperlink. The document with the embedded AppLink could then be shared with others, thereby providing access to a document through third-tier applications while simultaneously ensuring that the document remains in the document repository 6. The AppLink server 11 can automate the task of embedding the AppLink if so desired by the user.

Opening the AppLink. When an AppLink is opened, either by opening the HTML stub file or through selecting an embedded link, the user's browser will connect with the AppLink server 11 and provide the server 11 with the identifier associated with the desired document. Depending on the context, the AppLink server 11 may then prompt the user for authentication (i.e., to enter a username and password). In the context of e-mail attachments stripped by the e-mail gateway 2, the preferred embodiment requires user authentication. In most other contexts, the AppLink is designed for anonymous access, so no user authentication is normally required. Even without user authentication, it is possible to request a password for access by the user through the use of the parameters described above.

The AppLink server 11 also presents the user computer with options for dealing with the document associated with the AppLink. For instance, the user may choose to open the document via the third-tier application, download the document to a local directory on the user computer, or save the document to the user's account on the AppLink server 11, if such an account exists. These options will vary depending on the context and the parameters associated with the AppLink. For instance, if the user is an anonymous guest of the AppLink server 11 (without a user account), no save option will be made available. In addition, the E-mail server may be run so as to prohibit any downloading of attachments to user computers 9 during a predefined quarantine period, or the creator of the AppLink may have set the AppLink parameters to prohibit such downloading.

Assuming the user elects to open the associated document on the third-tier productivity application, the AppLink server 11 then uses the FMFile software layer 12 to retrieve the referenced document from the repository at 6. For authenticated, known users, the AppLink server 11 then makes the document available as a read-only file in the account maintained for the authenticated user by the AppLink server 11. This is generally accomplished by a file system link, compatible with standard file access protocols such as NFS and CIFS. For anonymous user, the document is placed in a single-use guest account that is created by AppLink server 11 for the purpose of allowing the anonymous user to access the document with the third-tier application.

After the document is retrieved, the AppLink server 11 identifies the associated third-tier productivity application. As explained above, the associated productivity application is either pre-identified by the AppLink or is determined at the time of opening by the AppLink server 11. The AppLink server 11 can use a combination of provisioning information stored and managed by the AppLink server 11 and the unique identity of the user accessing the attachment to select the application at the time of opening.

After identifying the associated productivity application, the AppLink server 11 returns a specially-formatted HTML page to the user's browser on computer 9, via the HTTP/HTTPS session established earlier. This specially formatted HTML page contains one or more Java applets designed to establish an AIP connection from the user's computer at 9 to RAA software running on the AppLink server 11. The preferred embodiment uses the Tarantella Enterprise 3 software for this remote access solution.

The AIP connection passes sufficient information, provided by the specially formatted HTML page, such that the RAA software running on server 11 may launch an appropriate application on a third-tier server running at 13, 14. It is important to note that, in the present invention, the productivity application is not launched directly on the third-tier server 13, 14 by the RAA software. Rather, the RAA software launches a specially designed application of the present invention that itself then launches and controls the identified productivity application.

Once this specially designed application controlling software, hereinafter referred to as the AppController, has launched on a server at either 13, 14, the corresponding user interface protocol (i.e., X11 for UNIX/Linux or RDP for MS Windows applications) is connected with the RAA software on the AppLink server 11. With the X11/RDP connection setup, the RAA software bridges the user interface data to the Java applets running on the user's computer 9. The AIP protocol data implements this bridge between the user's computer 9 and the RAA software running on the AppLink server 11.

Finally, the AppController launches the identified productivity application on server 13, 14. More specifically, the identified productivity application is launched on the same server 13, 14 that running the AppController. The desired document is then loaded by the AppController into the productivity application by using means specific to the applications and/or operating system. The productivity application accesses the document using file system protocols native to its environment—NFS for UNIX/Linux productivity applications at 14 or CIFS for Windows productivity applications at 13.

AppController: Third Tier Application Launch

Figure 2:
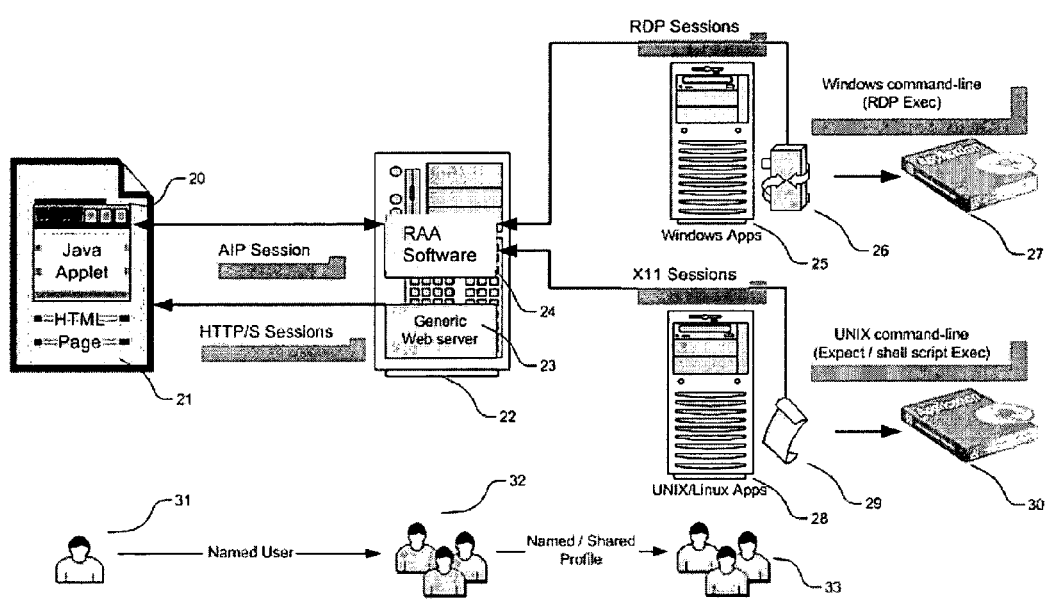
FIG. 2 is a schematic block diagram illustrating a typical remote application deployment environment using standard remote interface deployment technologies.

The AppController is most useful in two contexts: launching the third-tier application, and controlling the application after launch. FIG. 2 shows an overview of the launching of a third-tier application using prior art RAA software without the AppController. As shown in FIG. 2, a web browser 21 on the first-tier is able to display an HTML page with an embedded Java applet 20. A web server 23 runs on a server computer 22 on the second-tier, and provides an HTML page and a thin-client Applet 20 to the browser 21. The Applet 20 presents a user 31 with an interface that allows the user 31 to interact with third-tier productivity applications such as Windows application 27 and UNIX application 30 running on Windows server 25 or UNIX server 28, respectively. The browser 21 may or may not be isolated by a firewall or proxy from the application servers 25, 28 that run these productivity applications 27, 30.

An RAA software application 24, such as Tarantella Enterprise 3, also operates on the second-tier, either on the same physical computer 22 operating the web server 23 or on a separate computer. RAA software 24 launches the third-tier applications 27, 30 when prompted by the Java Applet 20. The request from Applet 20 is processed by a web or edge server 23 by decoding the URL attributes and possibly matching the request to information stored within a data store. This request may then be associated with a pre-established user profile 32 associated with user 31.

Assuming that the request is to start a server-side application 27, 30, the RAA software 24 initiates a third-tier application launch on the appropriate application server 25, 28 using a pre-provisioned user account 33 on the server 25, 28 and an associated application 27, 30.

To initiate the third-tier application, the RAA server 24 first specifies a particular user profile 33 that owns the process. The RAA server 24 then selects a third-tier application server 25, 28 to host the application and provides to that server 25, 28 the attributes necessary to start the appropriate productivity application 27, 30. On the Windows application server 25, the RAA server 24 launches the application 27 by starting a Terminal Services session 26 on the third-tier server 25, and then providing a command-line for invoking the productivity application 27. In the UNIX/Linux case, the RAA server launches the application 30 by starting a shell process 29 on the third-tier host 28 and providing a command-line for invoking the productivity application 30.

Note that in either case, the final command-line to start the productivity application may include an initial document to load or process, as well as any other command-line parameters that are supported by the given application. This is a single-shot process; once the productivity application starts there is no more interaction between the launching mechanism and the productivity application.

Once the third-tier application has launched, the user interface from the application servers 25, 28 are remote-deployed via the RAA server 24. The RAA server 24 manages the user interface input/output between the third-tier application server and the thin-client interface located within Java applet 20. When using Tarantella Enterprise 3 as the RAA software 24, the user interface input and output passing between the Windows application server 25 and the RAA software 24 is communicated using the RDP protocol, while the X11 (X Windows) protocol is used to communicate between the RAA software 24 and the UNIX application server 28. In other RAA server implementations (such as that provided by Citrix Metaframe from Citrix, Inc.), an Active X control is used in place of the Java applet 20.

Figure 3:
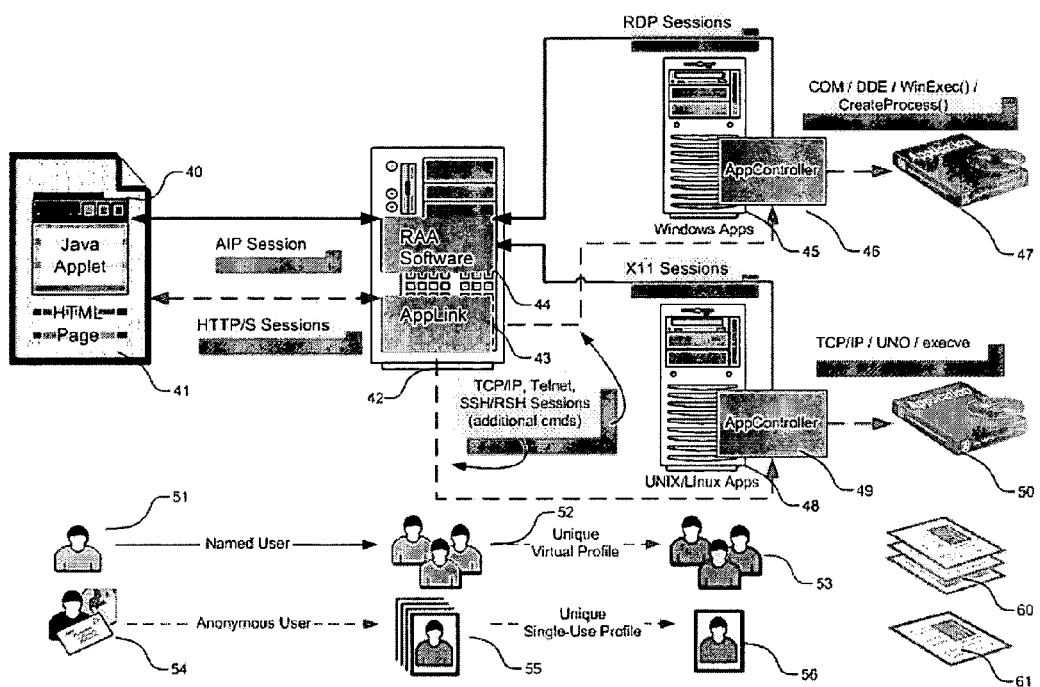
FIG. 3 is a schematic block diagram illustrating the flow of control and software component parts in the present invention.

FIG. 3 shows the starting of third-tier applications using an AppController 46, 49 of the present invention. In this figure, a known (or named) user 51 or an anonymous user 54 indicates a desire to review a remotely located document 61 (or group of documents 60) by selecting an AppLink. The selection of the AppLink opens an Internet browser 41, which communicates the desire to view the document 61 by submitting the AppLink ID to a web server portion of the AppLink server 43. The AppLink server 43 processes the request by decoding the AppLink ID and retrieving data stored by the AppLink server 43 under that ID. If an anonymous user 54 makes the request, the AppLink server 43 will then allocate or provision a unique, single-use profile account 56, from a pool of available accounts 55, and then initiate a third-tier application launch. A named user 51 will use a profile 53 associated with that user 51.

Initiating the third-tier application launch is dependent on the particular RAA software 44 in use, but ultimately the process includes specifying the user profile 53, 56 that owns the process, selecting a third-tier application server 45, 48 to host the application, and providing the attributes needed to start the productivity application 47, 50 (e.g., the command-line to launch a specific executable). Launching a specific executable (i.e., the productivity application) is accomplished, in the Windows case, by starting a Terminal Services session 46 on the third-tier host 45, which includes a command-line for invoking the Windows AppController 46, along with the necessary parameters to allow the launch of the appropriate productivity application 47. In the UNIX/Linux case, launching a specific executable implies first starting a UNIX/Linux AppController 49 on the third-tier host 48, and communicating to the AppController 49 the necessary parameters for invoking the productivity application 50.

As part of starting the third-tier application, the AppController 46, 49 executes processes designed to allow remote, network-aware software to communicate with the AppController 46, 49 during the execution of the third-tier applications 47. 50. The processes are dependent on the operating system hosting the third-tier application and/or the actual software application. Examples of these processes include, but are not limited to: a) creating and monitoring a named-pipe or Microsoft mail-slot to exchange simple text commands from network-callable programs running outside of the third-tier application's process space (which is always the case with Microsoft Terminal Server-hosted applications), and b) creating and monitoring a TCP/IP socket to exchange arbitrary commands from programs running elsewhere on a network accessible to both the AppController software 46, 49 and the AppLink software 43.

Since the AppController 46, 49 has started the third-tier application 47, 50 within its same process space, the remote user interface delivery process from the RAA software 44 to the Java applet 40 proceeds normally. That is, an interactive image of the application 47, 50 appears within the web Java applet 40 and is ready for use, as if the end-user were using a locally running application.

After starting the third-tier application 47, 50, on the third-tier server 45, 48, the AppController 46, 49 may then load any optionally requested documents 61 or document groups 60 into the application 47, 50 to be viewed and/or edited by the user 51, 54. The process for doing this is operating system and/or application dependent. Examples of techniques employed include, but are not limited to: a) including the relevant document name on the command-line to invoke the third-tier application, b) using operating system-specific calls that are supported by a sub-set of applications designed for the given platform (e.g., Component Object Model (COM) and/or Dynamic Data Exchange (DDE) calls specifically designed to load documents into running applications), and c) using application specific programmatic methods designed to allow document loading into a running instance of a specific application. As part of executing the AppController 46, 49 document loading processes, it may be necessary or desirable to consult a data store to determine the best way to interact with the third-tier application.

A detailed description of the Windows-specific mechanism appears in a subsequent section (Windows AppController—Launch Details). A detailed description of the UNIX/Linux-specific mechanism appears in a subsequent section (UNIX/Linux AppController—Launch Details).

Processing Commands Overview: AppController Enhanced Remote Application Deployment AppController: Controlling Application After Launch In addition to managing program launches, the AppControllers 46, 49 are effective tools for managing and deploying third-tier applications 47, 50 after launch. Referring again to FIG. 3, a user 51, 54 is able to interact with the remote productivity application 47, 50 through the thin-client operating in the Java Applet 40 running in browser 41. Certain commands made in applet 40 operate through the AppLink server 43, such as a request is to save changes to a document open in the remote productivity applications 47, 50. When these commands are made, the AppLink server 43 locates the associated third-tier application 47, 50 and initiates the appropriate commands to the AppController 46, 49 that is managing the given third-tier application.

By locating the associated third-tier application 47, 50, we mean determining which third-tier server 45, 48 is hosting the application and what user profile 53, 56 owns the process. Examples of techniques employed include, but are not limited to: a) maintaining a data store of third-tier server (45 and 48) information, including their running applications 47 and 50 and associated user profiles (which is easy to do, since the AppController is involved in starting/stopping the third-tier applications), or b) directly or indirectly querying the RAA system 44 for this information.

By initiating the appropriate commands to the AppController 46, 49 that is managing the given third-tier application, we mean leveraging the fact that the AppControllers 46, 49 are designed to allow communication with remote, network-aware software during the execution of the third-tier application 47, 50. This differs from the program launching description above, where the third-tier application 47, 50 are not yet running and so it is possible to implement portions of the AppController (46 and 49) functionality by means of a custom command-line argument. Once the third-tier applications 47, 50 are already running, this avenue is not always available—even to applications running in the same process space as the productivity applications 47, 50. Prior art RAA systems 44 and related technology that do not use AppControllers 46, 49 do not allow for the transmission of subsequent commands to control the productivity applications 47, 50 after the initial application launch.

AppController commands from the remote user interface 40, 41 and routed by the Marix server 43 may elicit a corresponding response to the system that may, in turn, initiate additional commands providing a serial mechanism to completely control the life-cycle of the third-tier application. An example of this includes, but is not limited to, a) starting a third-tier application, b) loading a specified document, c) initiating an application-level print request, and d) closing the document and exiting the application.

A detailed description of the Windows-specific mechanism appears in a subsequent section (Windows AppController-Command Details). A detailed description of the UNIX/Linux-specific mechanism appears in a subsequent section (UNIX/Linux AppController-Command Details).

AppController Architecture

Figure 4:
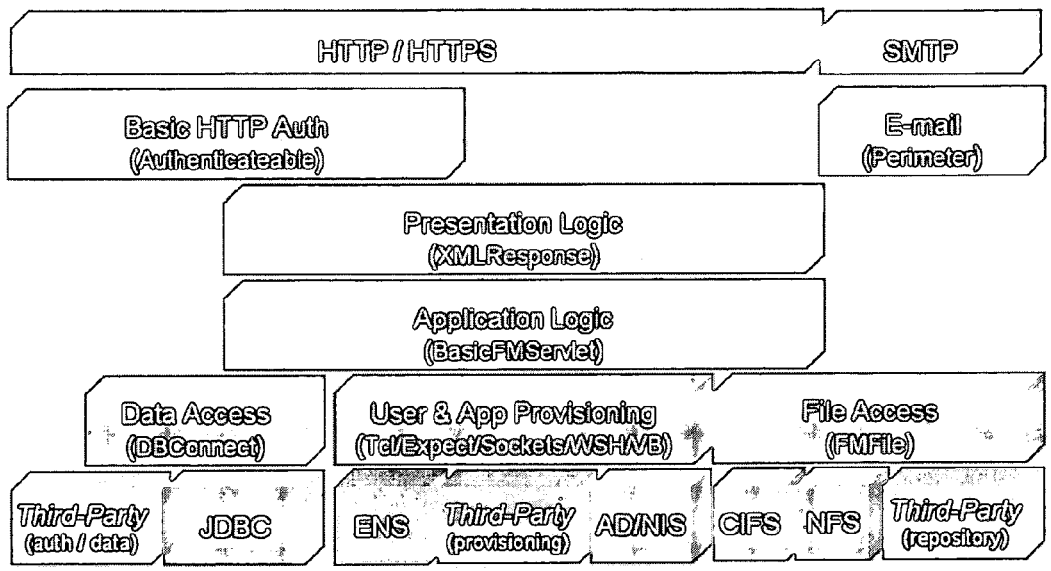
FIG. 4 is a block diagram that describes the components of the present invention from a software stack perspective.

Server Stack. Referring to FIG. 4, the AppLink server software 43 is designed to integrate into a variety of larger systems, presumably unknown at the time of design and/or deployment. Towards this end, integration points were included that may be easily connected to both Internet standard and proprietary software layers and protocols. At the top of the above illustration, standard Internet protocols (web/HTTP and e-mail/SMTP) provide portable entry points into the system. The middle portions of the illustration represent the Marix server software, implemented using a standard Model-View-Controller (MVC) paradigm.

The top-most Presentation Logic layer (View) is implemented using XSLT and, as such, it is reasonable to redesign/re-implement without knowledge of the remainder of the system. The next layer down implements the Application Logic (Controller), which provides the application or business logic and is implemented as a set of event-driven Java Servlets.

Finally, the Model layer is interfaced via the DBConnect layer (metadata access), the FMFile layer (document access) and a collection of user/application provisioning components. It is the Model layer that provides convenient interface points for external systems. Both DBConnect and FMFile are implemented using Bridge and Factory design patterns; as such, each interface may be easily extended. In the DBConnect case, the standard bridge is JDBC, a bridging mechanism to SQL databases. In the FMFile case, concrete implementations exist to manage files on both SMB/CIFS and NFS-based files systems. As FMFile supports a locking/check-in/check-out paradigm, third-party document repositories may be accommodated with little effort.

Figure 5:
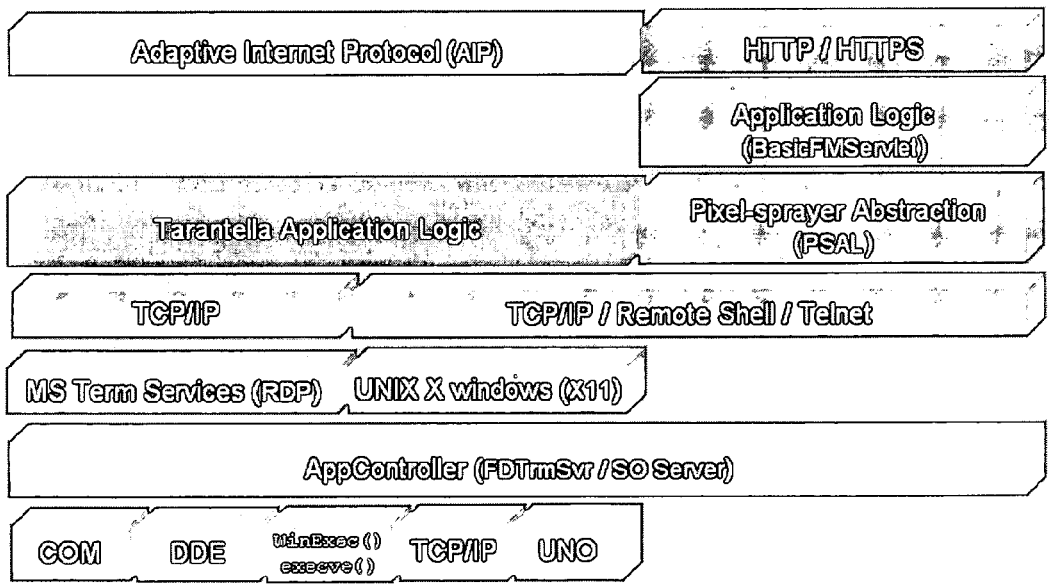
FIG. 5 is a block diagram that describes the components of the present invention on the third-components from a software stack perspective.

Third Tier Stack. Referring to FIG. 5, AppLink third-tier integration points are designed to provide maximum control and flexibility over the productivity applications. The left-hand side of FIG. 5 is the domain of the user interface protocol bridge provided by the RAA software 44 (e.g., Tarantella Enterprise 3's Adaptive Internet Protocol, which bridges both Microsoft Windows Remote Desktop Protocol and UNIX X11). The AppController 46, 49 is called by both the RAA software 44 and the AppLink server software 43 to manage the productivity application 47, 50; note that the latter calling mechanism occurs outside of the realm of the RAA software 44.

In turn, the AppController 46, 49 utilizes APIs native to the productivity application domain. Thus, the third-tier integration points are composed of productivity application APIs exposed to external software and/or manipulated via standard system calls.

Windows AppController—Launch Details

Figure 6:
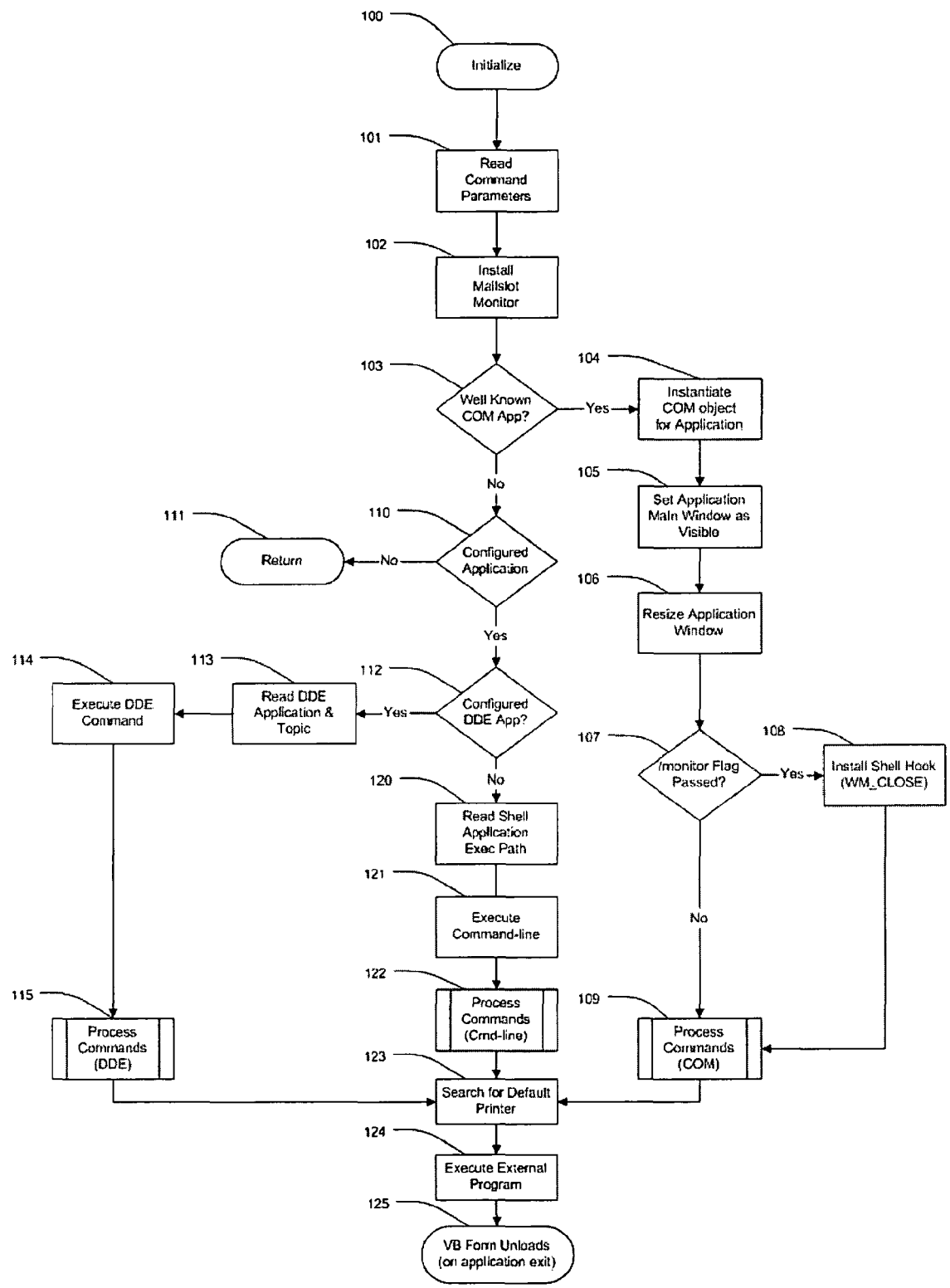
FIG. 6 is a flow chart showing the process of the present invention in the Windows environment for starting a third-tier application and process the initial set of passed-in parameters.

FIG. 6 shows a flow chart that describes the details of launching a Windows productivity application 47 using an AppController 46 of the present invention. The first step 100 in the process is for the RAA software 44 to initialize the Windows AppController 46. The AppController program 46 then processes any supplied command-line parameters in step 101. A complete description of the supported command-line parameters is given below. The next step 102 is to initialize the Microsoft Windows mail-slot used for communication from programs outside of the MS Terminal Services process boundary. The mail-slot name is chosen from one of the passed in command-line parameters. The mail-slot is monitored by a background thread; the details of reading and processing mail-slot passed commands are given below.

COM-driven Applications. After the mail-slot monitor is setup, the remainder of the steps implements the initial productivity application launch and configuration. The first step 103 is to examine the '/a' switch, which gives the application name, to see if the application 47 is a well-known MS COM-driven application. If the application type is well-known (e.g., MS Word), then the AppController 46 proceeds with a COM-style application launch at step 104. Starting a well-known COM application means instantiating the COM object for the application. After this has finished, the AppController 46 must set the main application window controlled by the RAA server 44 to a visible state in step 105 and then resize the application window to completely fill the Terminal Services session screen size in step 106.

Instantiating the COM object for an application 47 will result in a state where the AppController 46 maintains a reference to the COM object, throughout the process life of the application. However, some applications 47 will not shutdown or close, as long as an external program has such a reference. This might create a circular dependency condition. To prevent this, the AppController 46 will check for the '/monitor' flag on startup in step 107. If present, the monitor flag tells the AppController to install a shell-hook in step 108 to look for a specific Windows message called WM_CLOSE. The WM_CLOSE message always follows a user action commanding the application to close (e.g., clicking on the File-Exit menu option). When the AppController detects such a message, the AppController releases its reference to the application COM object, allowing the application 47 to close normally.

In any event, after starting the application 47 and displaying the main window, the COM-aware AppController 46 processes any remaining command-line parameters, using COM APIs that are specific to the given application in step 109.

DDE-driven Applications. If the productivity application 47 is not a well-known COM application as determined at 103, the next step 110 is for the AppController 46 to determine if the application 47 has been configured in the application data-store. The application data-store is normally contained within the third-tier server's registry, but may also be a network accessible database. If the application 47 is not a configured application, the AppController 46 exits and returns control to the Terminal Services session for session shutdown at step 111. Otherwise, the next test at step 112 is to determine if the configured application 47 is a DDE-enabled application. DDE, or Dynamic Data Exchange, is a pre-COM API model supported by many commercial Windows applications. DDE supports a basic command structure that allows the calling program to launch an application, load a document, and print a document as well as a host of application-specific tasks. In particular, the DDE 'application' and 'topic' strings can be used to launch an instance of a DDE-enabled application. These parameters are read from the configured applications storage area in step 113. Finally, the DDE-aware application 47 is launched at step, 114, using DDE system calls available to the AppController 46 via the Win32 APIs.

After starting the application 47, the DDE-aware AppController 46 processes any remaining command-line parameters in step 115, using DDE commands that are specific to the given application. Note that in most cases, this limited to loading documents and/or initiating print requests. The 'DDE Message', the 'Application' and the 'Topic' strings required to initiate DDE calls to the productivity application 47 are configured in the data-store, making it easy to add support for applications not known/tested for at the time the AppController 46 is deployed to a given set of third-tier servers.

Process-driven Applications. If the productivity application 47 is not a well-known COM application, or a configured DDE-aware application, the next step 120 is to read the shell application executable path and launch parameters from the data-store. These are productivity applications 47 that support a limited command set, with respect to the AppController 46 (i.e., for the most part, all the AppController 46 can do is start and stop the productivity application 47 although, through the use of shell hooks, it would be possible to externally drive these applications 47 as though the user had clicked on certain options). After determining the launch command-line, the next step 121 is to execute the application process, using a standard Win32 API call—such as 'CreateProcessNoSecurity' or 'WinExec.'

After starting the application 47, the AppController 46 processes any remaining command-line parameters at step 122, which is limited to stopping the application 47 or loading an initial document 61. As explained above, command-line-driven applications 47 sometimes support multiple invocations by merely processing command-line parameters against the currently running process (i.e., loading a new document). In other cases, a second invocation of the same command-line will produce a second copy of the productivity application 47—in this case, loading additional documents 60 into a current instance is not supported.

Post Processing. After launching the productivity application 47 and processing all AppController commands, the Windows AppController 46 ensures that the Terminal Services environment has a valid, default printer selected 123. A small dialog box is presented to the user to show printer detection progress. This is to prevent printer errors that occur when the user selects a printing option before completing the setup between the remote printer and the third-tier productivity application 47. After post-processing the printer setup, the AppController 46 waits for the productivity application to exit. At this point, if specified on the AppController command-line, an external application or batch command may be executed at step 124. Finally, the Visual Basic form unloads and the AppController 46 has completed execution 125.

Windows AppController—Command Details

Figure 7:
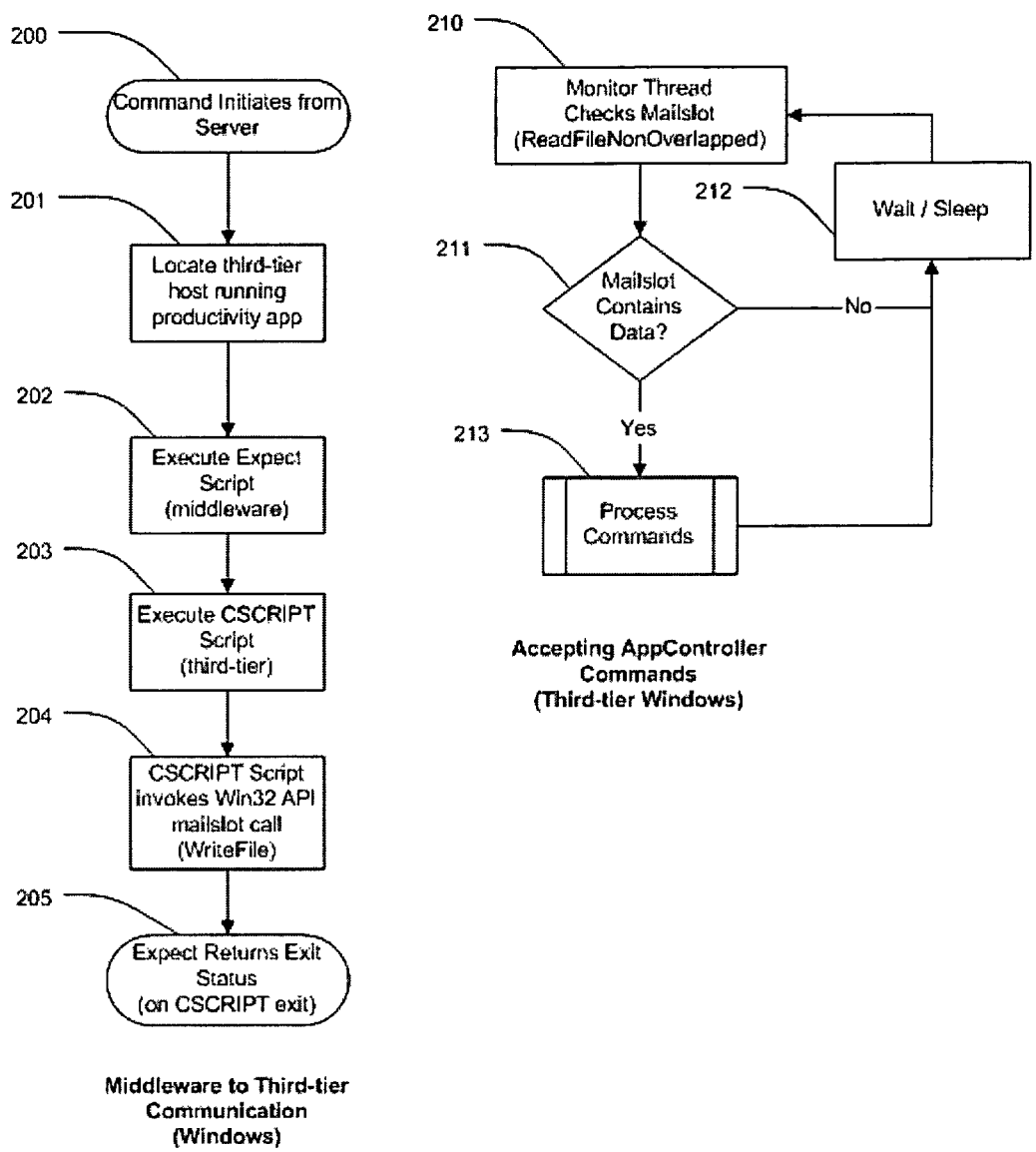
FIG. 7 is a flow chart showing the process of the present invention in the Windows environment for processing subsequent commands, from the middleware layer, to manage the productivity application.

Referring to FIG. 7, there are two parts to programmatically commanding the third-tier productivity application 47: passing the command from the middle-tier AppLink software 43 and receiving the command at the AppController 46.

Passing the Command. Assuming that the command originates from the Enterprise File Manager (or similar, middle-tier software) at step 200, the AppController 46 must determine if the appropriate third-tier application has already been launched. To do this, the middle-tier server 43 locates the third-tier host 45 that is running the productivity application 47 in step 201. There are a variety of techniques for doing this, but in the case of Tarantella Enterprise 3 it is a simple matter of interrogating the RAA server 44 with the correct identifier and then parsing the results.

Once the application-hosting third-tier server 45 has been located, the next step 202 is to invoke an Expect script. The Expect script automates an interactive login process (i.e., using protocols like telnet, secure shell and/or remote shell) to allow the middle-tier AppLink server 43 to establish a login session with the third-tier host 45. The login session may then programmatically execute command-line applications on the third-tier host 45. In the Windows case, Microsoft CSCRIPT is used in conjunction with an AppController-specific Windows Scripting Host (WSH) script in steps 203 and 204. The WSH script invokes, in turn, a Visual Basic application as part of the Windows AppController 46. The Visual Basic application accepts a series of command-line parameters and writes them, verbatim, to the Microsoft mail-slot established previously, as described above. This is accomplished using the Win32 API function WriteFile. The mail-slot name is contained within one of the parameters passed to the CSCRIPT command.

Finally, the CSCRIPT command returns the status of the command-line invocation to the Expect script, which returns a similar status code to the calling middle-tier software 43 in step 205. For the most part, there are only three status codes to look for: 1) mail-slot doesn't exist, which means that the third-tier application launch process has failed/has not yet completed; 2) the CSCRIPT environment failed to operate, which means there may be a security configuration problem on the third-tier host 45; 3) the entire process worked as detailed above and the command was successfully placed into the mail-slot, as indicated by the command-line parameters.

Receiving and Processing the Command. As mentioned above in connection with step 102, the Windows AppController 46 establishes a mail-slot for receiving commands from the middle-tier AppLink server 43. The Windows AppController 46 starts up a form called FMListener. This form's responsibilities include maintaining the 'm_oAppInterface' object. This object will then be "Typed" to a specific application (e.g., CExcelInterface, CWordInterface, for MS Excel and MS Word, respectively). This form will communicate to the application object via a common interface (IAppInterface) that all application objects must implement—in the COM-driven application case, anyway. This interface includes methods to Start, Stop, Close Files, et al. Each specific application object is responsible for implementing these methods in the manner that is correct for that particular application 47.

Additionally, a separate thread called CListener is responsible for listening to the Win32 mail-slot, also started at step 102. When the CListener thread gets a message from the mail-slot, it raises an event to the FMListenerForm using the RaiseEvent function. Thus, in step 210 of FIG. 7, the FMListener Form handles the events for the CListener class and checks for data in the mail-slot, using the Win32 API function ReadFileNonOverlapped. Assuming that the mail-slot contains valid data as determined in step 211, the FMListener form processes the commands contained within the form at step 213. Command processing is implemented using the same techniques detailed above in connection with the launching of the application 47. After all mail-slot commands are processed, the AppController 46 returns to a wait/sleep state, pending the next mail-slot event 212.

UNIX/Linux AppController—Launch Details

The UNIX/Linux AppController 49 is similar in spirit to the Windows AppController 46, but wide differences in programming methodologies between UNIX/Linux and Windows suggest a different implementation. The following sections discuss these differences.

Figure 8:
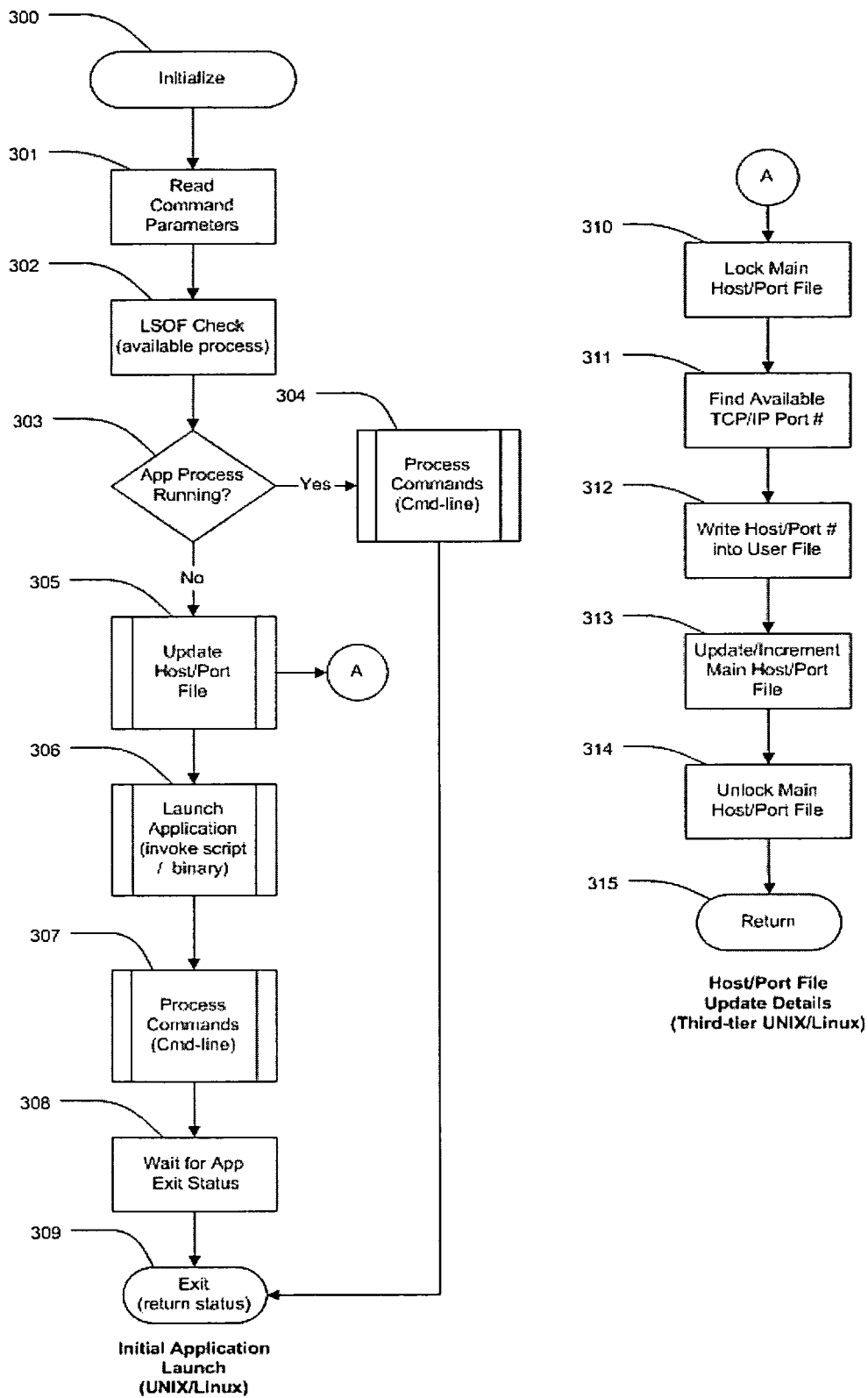
FIG. 8 is a flow chart showing the process of the present invention in the UNIX/Linux environment for starting a third-tier application and process the initial set of passed-in parameters.

Initial Application Launch. FIG. 8 shows a flow chart for launching a UNIX/Linux productivity application 50 (e.g., Sun Microsystems StarOffice) using a third-tier instance of a UNIX/Linux AppController 49. The AppController program 49 initializes in step 300, then processes any supplied command-line parameters 301. A complete description of the supported command-line parameters is given below. The next step 302 is to initiate a system call, called LSOF, to check the third-tier host 48 for a running process of the productivity application 50, running as the given third-tier user 53, 56. If the appropriate process already exists as determined in step 303, the third-tier user 53, 56 is already running an instance of the same application or another application from within the application suite. An example of this is Sun Microsystems StarOffice, which uses a single process to present separate application types (e.g., word processor, spreadsheet, presentation, drawing and formulas). This means that a user 53, 56 may already be running a word processor and then try to load a spreadsheet into a new window. If this is the case, all that is left to do in step 304 is to process the application command-line (e.g., load the new document into a window of the correct application type, using APIs specific to the application).

If step 303 determines that an appropriate application process is not already running, the AppController 49 must start the productivity application. UNIX/Linux applications 50 do not benefit (or suffer, depending on your viewpoint) from the variety of APIs that are available on the Windows platform. The standard technique for allowing programmatic control of a productivity application is to listen on a TCP/IP socket and then accept a set of documented strings and/or binary structures that command the application 50. That is, implement a sockets-based API.

Sun Microsystems StarOffice is just such an application. The StarOffice API of this type is known as UNO (Universal Naming Objects) when accessed through an object-oriented language such as Java. Most of the details of UNO (or any sockets-based API) are not important to this invention, except for one: managing the TCP/IP port number the productivity application 50 uses to implement the socket listener. Productivity applications 50 that provide a sockets-based API usually provide a mechanism (e.g., a command-line parameter) for specifying the TCP/IP port with which to listen. The UNIX/Linux AppController 49 maintains a text file that contains the name of the third-tier host 48 and the TCP/IP port number used to communicate with a running productivity application 50. The details of updating the Host/Port file are provided below. At this point, it is only necessary to note that step 305 allows the UNIX/Linux AppController 49 to determine the correct TCP/IP port number and store this information.

With the third-tier host 48 and TCP/IP port number information gathered, the next step 306 is to launch the productivity application 50. That is, execute the script and/or binary file necessary to start the application 50. This process will often be specific to the productivity application 50, but in the case of StarOffice it is a matter is invoking the correct script with the correct factory type (i.e., word processor, spreadsheet, etc), the TCP/IP port number to listen on and any follow-on parameters (in step 307). An example of a follow-on parameter would the pathname to a document to load and display.

Finally, the launching application waits for the X windows application exit status (step 308), for eventual return to the launching middleware software 44 in step 309.

Host/Port File Update. Launching a UNIX/Linux productivity application requires an update to the host/port file, which is detailed at A in FIG. 8. The main host/port file is stored in the third-tier host's application directory—one file per application installed on a given host 48. Using UNIX/Linux file system calls, the first step 310 of sub-part A is to lock the main host 48 to prevent concurrent access. Next, using UNIX/Linux system calls, the AppController 49 scans the local host 48 for an available TCP/IP port at step 311. The search occurs within a range specified by the configuration of the AppController 49. Once an unused TCP/IP port is found, the application host 48 and TCP/IP port number is written to a file located within the third-tier user's home directory at step 312. This is to ensure that the third-tier user's instance of the productivity application 50 may be uniquely contacted, via a TCP/IP connection, from the middle-tier software 43.

With the user information updated, the main host/port file is updated with the last used TCP/IP port number for the given host at step 313. This is to facilitate faster searches for available TCP/IP port number, by remembering the last used port. After updating the main host/port file, the file is unlocked to allow the next AppController 49 instance access to the file for reading and/or writing.

UNIX/Linux AppController—Command Details

Figure 9:
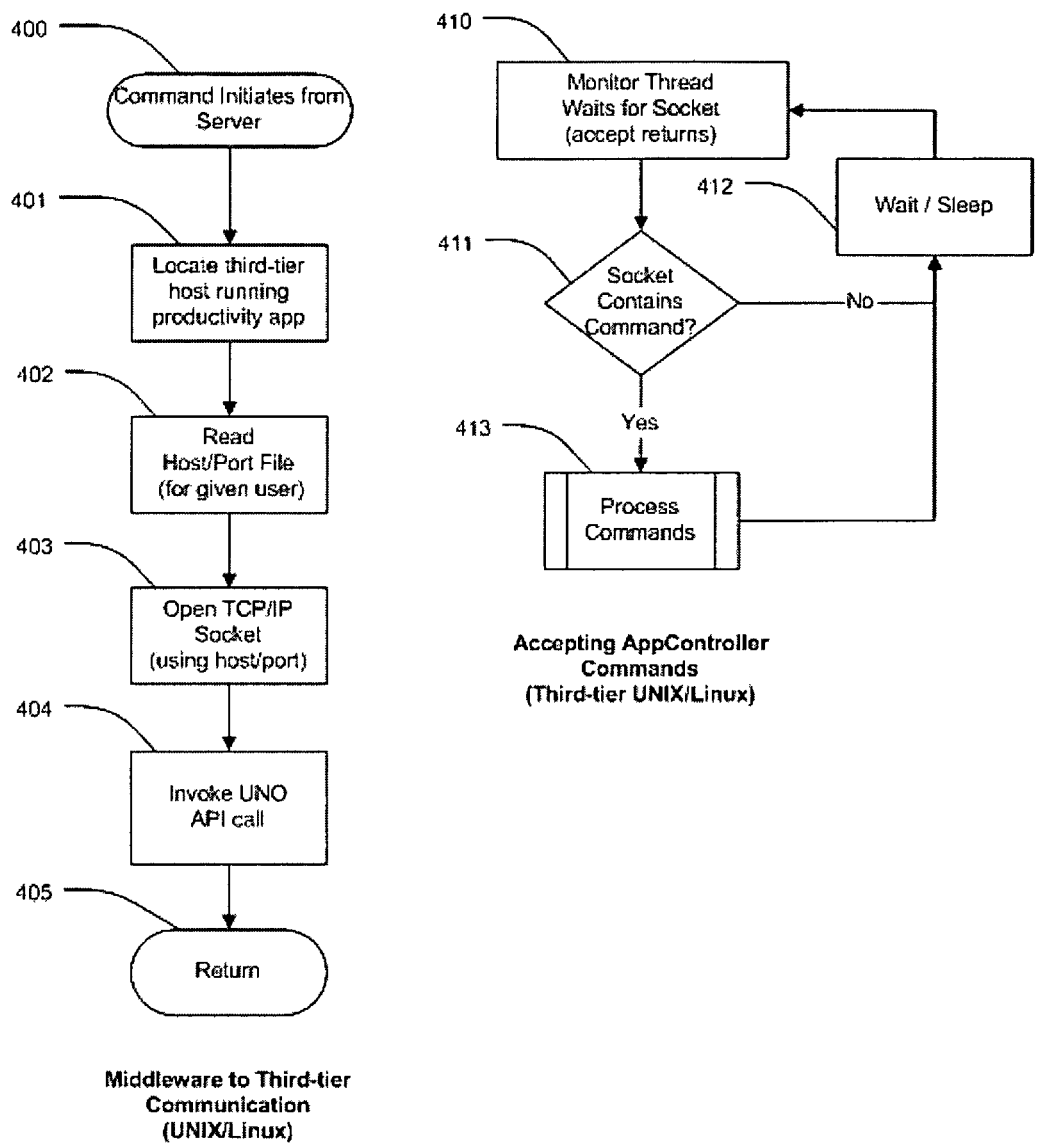
FIG. 9 is a flow chart showing the process of the present invention in the UNIX/Linux environment for processing subsequent commands, from the middleware layer, to manage the productivity application.

FIG. 9 shows two parts to programmatically commanding the third-tier productivity application: passing the command from the middle-tier software and receiving the command at the AppController. These parts are described below.

Passing the Command. To pass a command to the third-tier productivity application 50, the productivity application must be running. The AppLink server software 43 initiates a command to programmatically manage the third-tier application 50 (e.g., load a new document) in step 400. This UNIX/Linux process differs from the Windows equivalent, in some cases, as the productivity application 50 may provide API software that is compatible with the middle-tier software. For example, Sun StarOffice provides a Java-based API that may directly interact with the productivity application 50 over a network, thus eliminating the requirement to initiate a login session to the third-tier host 48.

The next step 401 is to locate the particular host running the appropriate third-tier application. There are a variety of techniques for doing this, but in the case of Tarantella Enterprise 3 it is a simple matter of interrogating the RAA server 44 with the correct identifier and then parsing the results.

Next, in step 402 the middle-tier AppLink Server 43 reads the host/port file for the given application 50, for the correct third-tier user 53, 56. With the correct host and TCP/IP port identified, the middle-tier software 43 initiates a socket connection to either the AppController 49 or the productivity application 50 itself, depending on what is supported by the application 50 (step 403). In the case of Sun StarOffice, the application 50 supports a direct connection without an intermediary program.

In either case, the final step is to invoke the application-specific API call necessary to implement the desired behavior (i.e., loading the document 61) in step 404. In the case of Sun StarOffice, the UNO classes provide a direct API call to programmatically command the application 50 to load a new, named document 61. In other cases, a resident AppController 49 may perform the document load by simply executing a new command-line with the appropriate parameters. After executing the command, the middle-tier AppLink server software 43 and/or the AppController software 49 returns control to the caller in step 405.

Receiving and Processing the Command. As mentioned above in connection with UNIX/Linux Launch Details, the UNIX/Linux AppController 49 establishes a socket listener for receiving commands from the middle-tier 43 (shown as step 410 in FIG. 9). Assuming that the socket contains valid data (step 411), the Application 50 and/or the AppController 49 processes the commands contained within the TCP/IP packet in step 413. Command processing is implemented using the same techniques described above. After all pending commands are processed, the Application 50 and/or AppController 49 will return to a wait/sleep state, pending the next socket event 412.

The actual commands that are passed by the AppLink Server 43 to the AppController 46, 49 in the preferred embodiment of the present invention are set forth in Tables 1 and 2. Table 1 shows those commands that are directed to the applications 47, 50. These commands relate to opening and closing files, tracking changes, saving files, printing files, retrieving application information, and making an application visible and invisible. Table 2 shows those commands that are directed toward controlling the behavior or the AppControllers 46, 49. These commands vary from opening an application and making the application visible or invisible to changing the username for a session. The AppController commands also control the functioning of the AppControllers 46, 49 themselves, such as by specifying what programs to run when the AppController 46, 49 exits, naming the mailslot, closing files, and terminating the listener portion of the AppController 46, 49.

Of course, many possible combinations of features and elements are possible within the scope of the present invention. Because many such combinations are present, the scope of the present invention is not to be limited to the above description, but rather is to be limited only by the following claims.

What is claimed is:

1. A method of programmatically managing a third-tier productivity application where a first-tier user accesses the third-tier productivity application over a network through a second-tier server running remote application access software, the method comprising the steps of:
   a. initiating an application managing program in a third-tier process space;
   b. said application managing program launching the third-tier productivity application in the third-tier process space;
   c. passing user interface and user commands between the third-tier productivity application and a first-tier computer via the remote application access software;
   d. transmitting a command from the second-tier server to the application managing program; and
   e. the application managing program controlling the third-tier productivity application in accordance with the command received from the second-tier server.

2. The method of claim 1, wherein the command from the second-tier server to said application managing program comprises a command to load a data file into the third-tier productivity application.

3. The method of claim 2, wherein the data file is opened allowing only read-only access.

4. The method of claim 1, wherein the application managing program consults a data store for data about the third-tier application, and wherein said data store contains information on a process by which the application managing program can control the third-tier productivity application.

5. The method of claim 1, wherein the command is an instruction to modify display attributes of the third-tier productivity application.

6. The method of claim 1, wherein the command is an instruction to toggle a run-time attribute of the third-tier productivity application.

7. The method of claim 6, wherein the run-time attribute is chosen from a set including tracking user edits, showing changes to a data file, and, if the data file is a document, highlighting portions of the document.

* * * * *